(12) United States Patent
Brand et al.

(10) Patent No.: US 11,996,648 B2
(45) Date of Patent: May 28, 2024

(54) PLUG CONNECTOR PART FOR CONTACTING IN MULTIPLE SPATIAL DIRECTIONS

(71) Applicant: Phoenix Contact GmbH & Co. KG, Blomberg (DE)

(72) Inventors: Fredrik Brand, Schieder-Schwalenberg (DE); Bernd Behling, Steinheim (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 283 days.

(21) Appl. No.: 17/311,699

(22) PCT Filed: Dec. 2, 2019

(86) PCT No.: PCT/EP2019/083242
§ 371 (c)(1),
(2) Date: Jun. 8, 2021

(87) PCT Pub. No.: WO2020/120186
PCT Pub. Date: Jun. 18, 2020

(65) Prior Publication Data
US 2022/0029345 A1    Jan. 27, 2022

(30) Foreign Application Priority Data
Dec. 13, 2018    (DE) ..................... 10 2018 132 142.2

(51) Int. Cl.
*H01R 13/502* (2006.01)
*H01R 13/04* (2006.01)
*H01R 13/11* (2006.01)
*H01R 13/627* (2006.01)
*H01R 13/629* (2006.01)
(Continued)

(52) U.S. Cl.
CPC ........... *H01R 13/502* (2013.01); *H01R 13/04* (2013.01); *H01R 13/113* (2013.01); *H01R 13/6275* (2013.01); *H01R 13/629* (2013.01); *H01R 24/60* (2013.01); *H01R 13/521* (2013.01)

(58) Field of Classification Search
CPC ...... H01R 24/60; H01R 13/73; H01R 13/113; H01R 13/04; H01R 13/502; H01R 13/521; H01R 13/6275; H01R 13/629
USPC .................................................. 439/224, 288
See application file for complete search history.

(56) References Cited

U.S. PATENT DOCUMENTS

| 3,208,027 | A |   | 9/1965  | Johnson |
|-----------|---|---|---------|---------|
| 3,986,762 | A | * | 10/1976 | Reeder ................. H01R 27/00 439/218 |
| 4,655,522 | A |   | 4/1987  | Beck, Jr. et al. |

(Continued)

FOREIGN PATENT DOCUMENTS

| DE | 102014102555 B4 | 3/2016 |
|----|-----------------|--------|
| FR | 2246990 A1      | 5/1975 |

(Continued)

*Primary Examiner* — Marcus E Harcum
(74) *Attorney, Agent, or Firm* — LEYDIG, VOIT & MAYER LTD.

(57) ABSTRACT

A plug connector part for electrical connection to a counter plug connector part includes: a housing; and a plurality of contacts arranged on the housing such that the plurality of contacts are electrically contactable from different plugging directions by counter contacts of the counter plug connector part. An angular location of the contacts relative to the housing is fixed.

16 Claims, 12 Drawing Sheets

(51) Int. Cl.
 H01R 24/60 (2011.01)
 H01R 13/52 (2006.01)

(56) References Cited

U.S. PATENT DOCUMENTS

| | | | | | |
|---|---|---|---|---|---|
| 4,671,600 | A * | 6/1987 | Sawai | ............ | H01R 31/06 |
| | | | | | 439/651 |
| 5,847,345 | A * | 12/1998 | Harrison | ............ | H01H 13/585 |
| | | | | | 200/11 G |
| 5,964,610 | A * | 10/1999 | McCoy | ............ | H01R 25/006 |
| | | | | | 439/222 |
| 6,109,952 | A * | 8/2000 | Jaag | ............ | H01R 4/4827 |
| | | | | | 439/441 |
| 6,461,178 | B1 * | 10/2002 | Fu | ............ | H01R 31/06 |
| | | | | | 439/224 |
| 6,547,578 | B2 * | 4/2003 | Huang | ............ | H01R 25/003 |
| | | | | | 439/224 |
| 6,692,316 | B2 * | 2/2004 | Hsieh | ............ | H01R 13/5205 |
| | | | | | 439/224 |
| 7,387,521 | B1 * | 6/2008 | Weber | ............ | H01R 13/28 |
| | | | | | 439/31 |
| 8,246,357 | B2 | 8/2012 | Chen | | |
| 9,153,889 | B2 * | 10/2015 | Germ | ............ | H01R 13/113 |
| 9,711,897 | B2 * | 7/2017 | Ho | ............ | H01R 13/631 |
| 2008/0153318 | A1 | 6/2008 | Weber | | |
| 2011/0256740 | A1 | 10/2011 | Naito et al. | | |
| 2014/0315410 | A1 | 10/2014 | Omori et al. | | |
| 2017/0047682 | A1 | 2/2017 | Ho | | |
| 2019/0109408 | A1 * | 4/2019 | Maddens | ............ | H01R 13/5219 |

FOREIGN PATENT DOCUMENTS

| | | |
|---|---|---|
| FR | 2391574 A1 | 12/1978 |
| JP | 2011227997 A | 11/2011 |
| JP | 2013058381 A | 3/2013 |

* cited by examiner

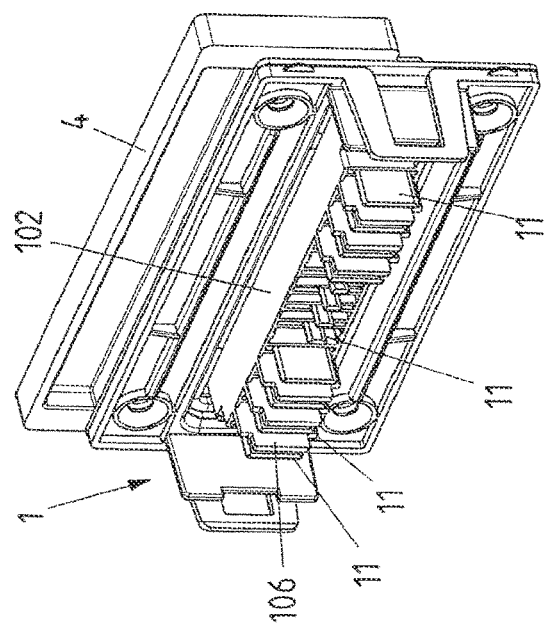
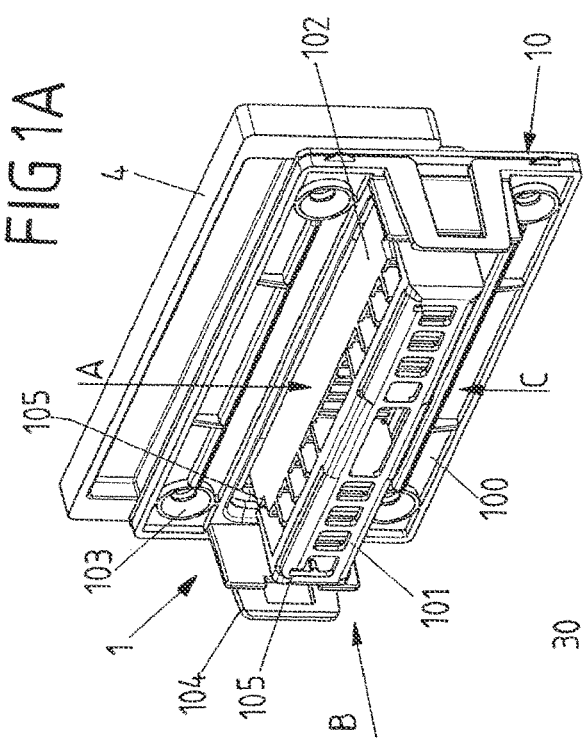
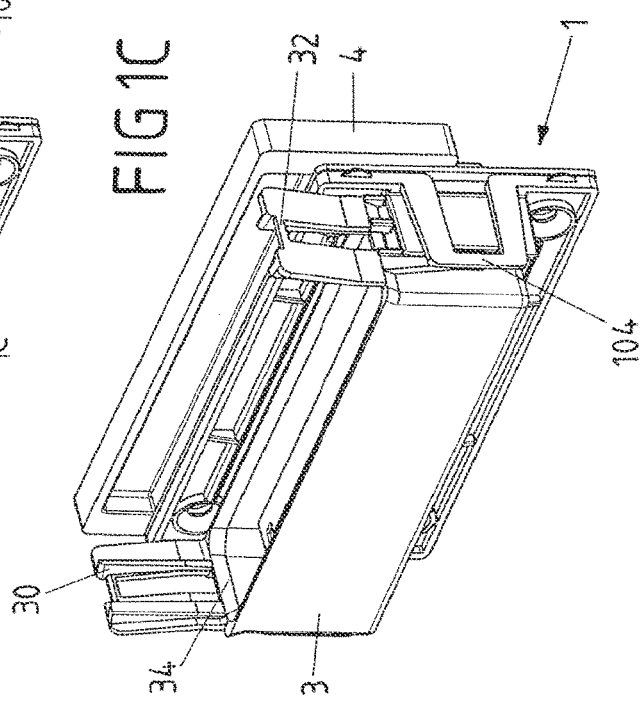

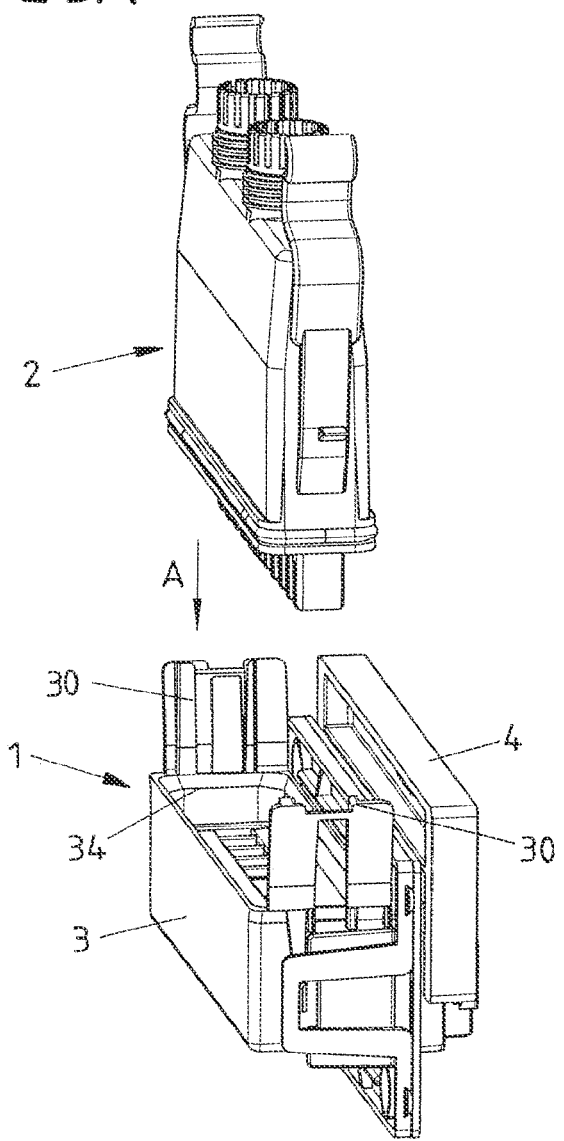

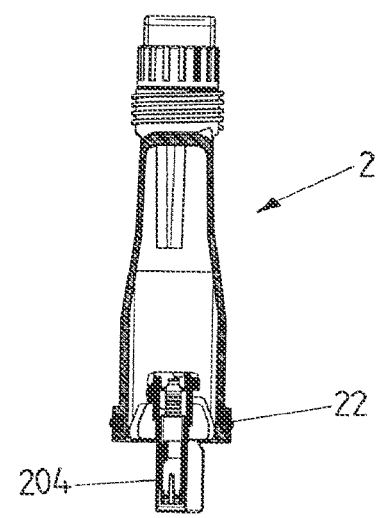
FIG 3C
A-A
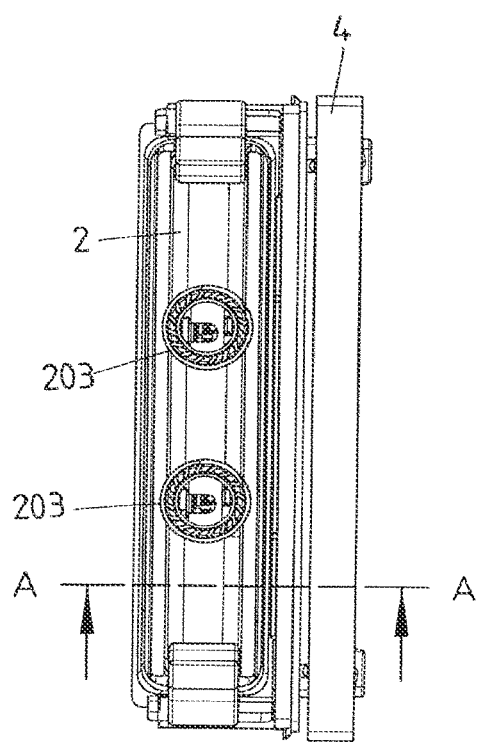
FIG 3B
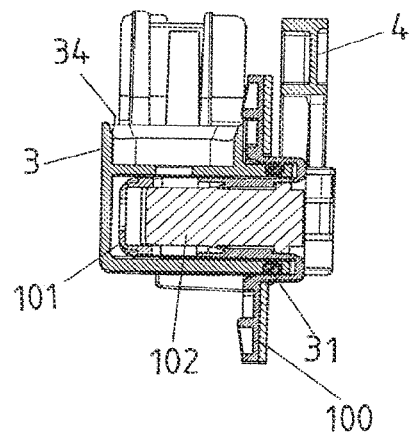

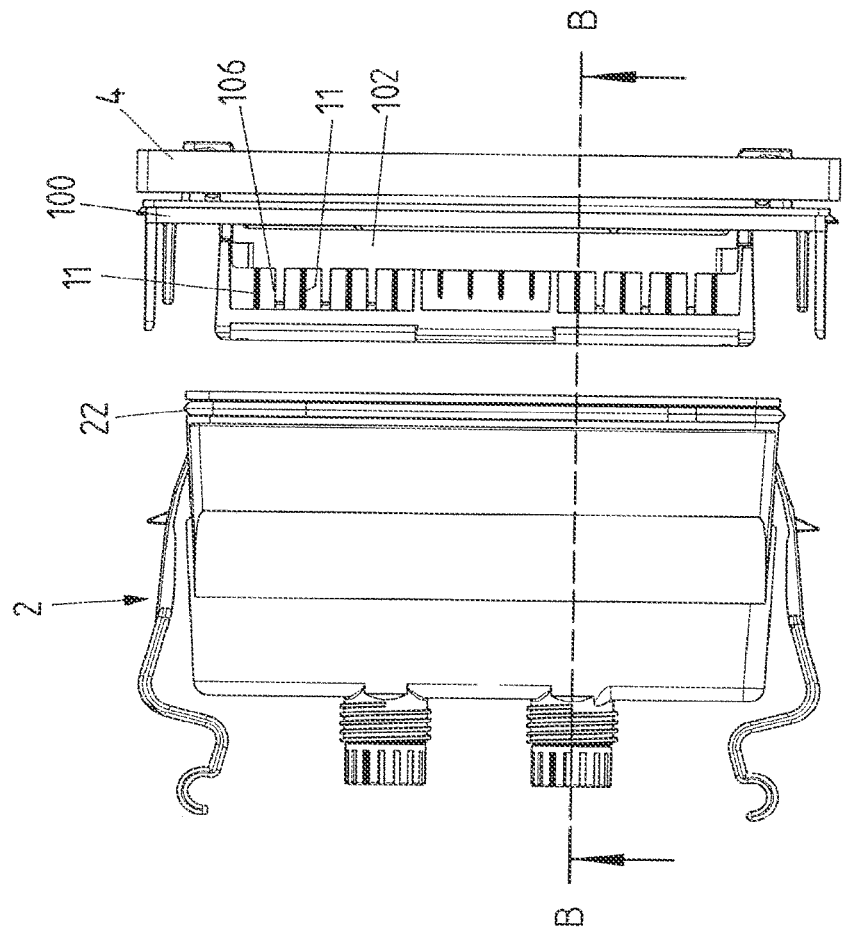
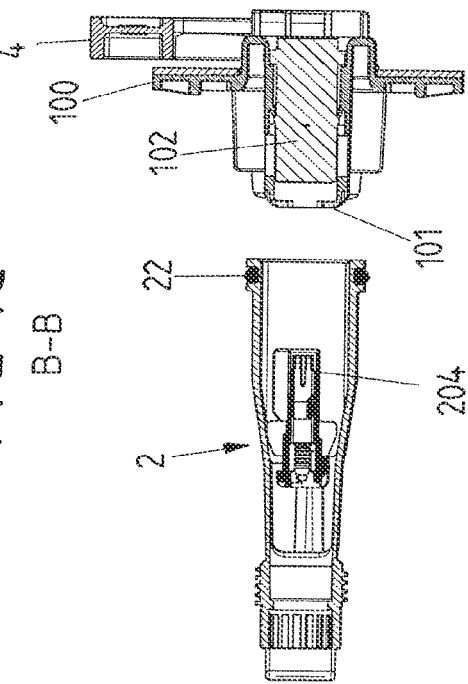

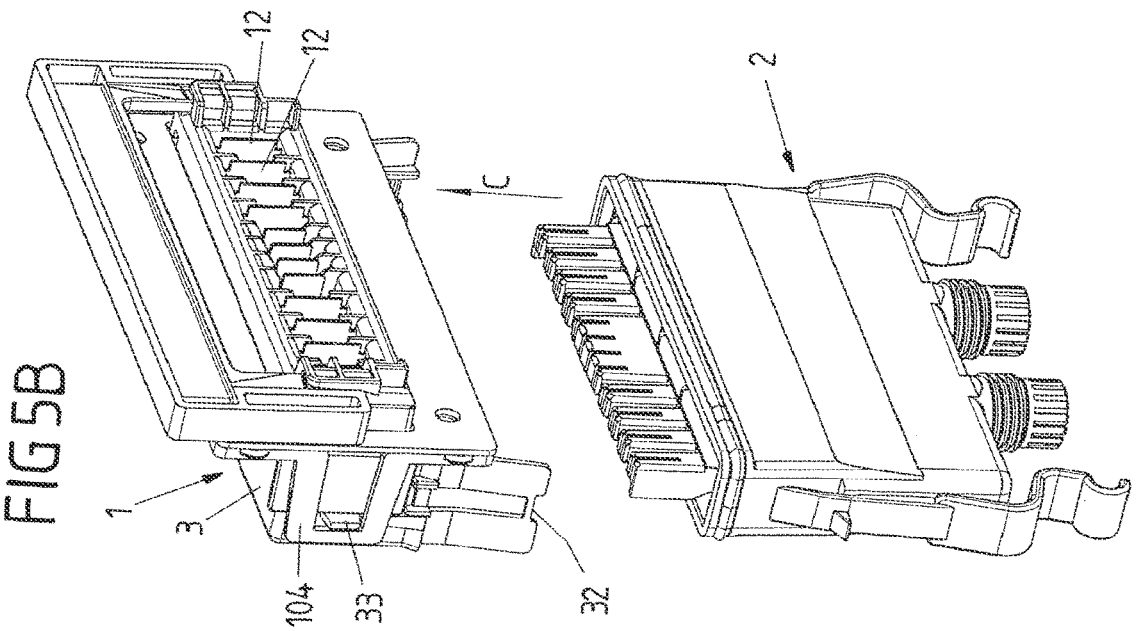
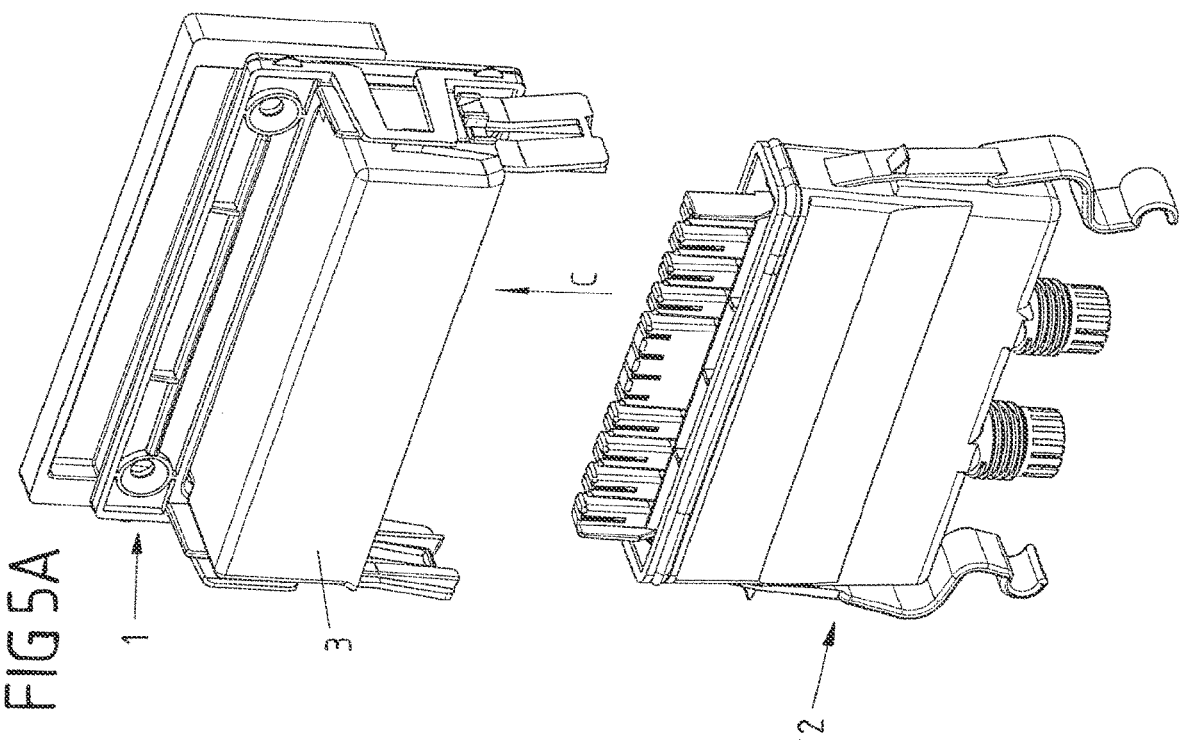

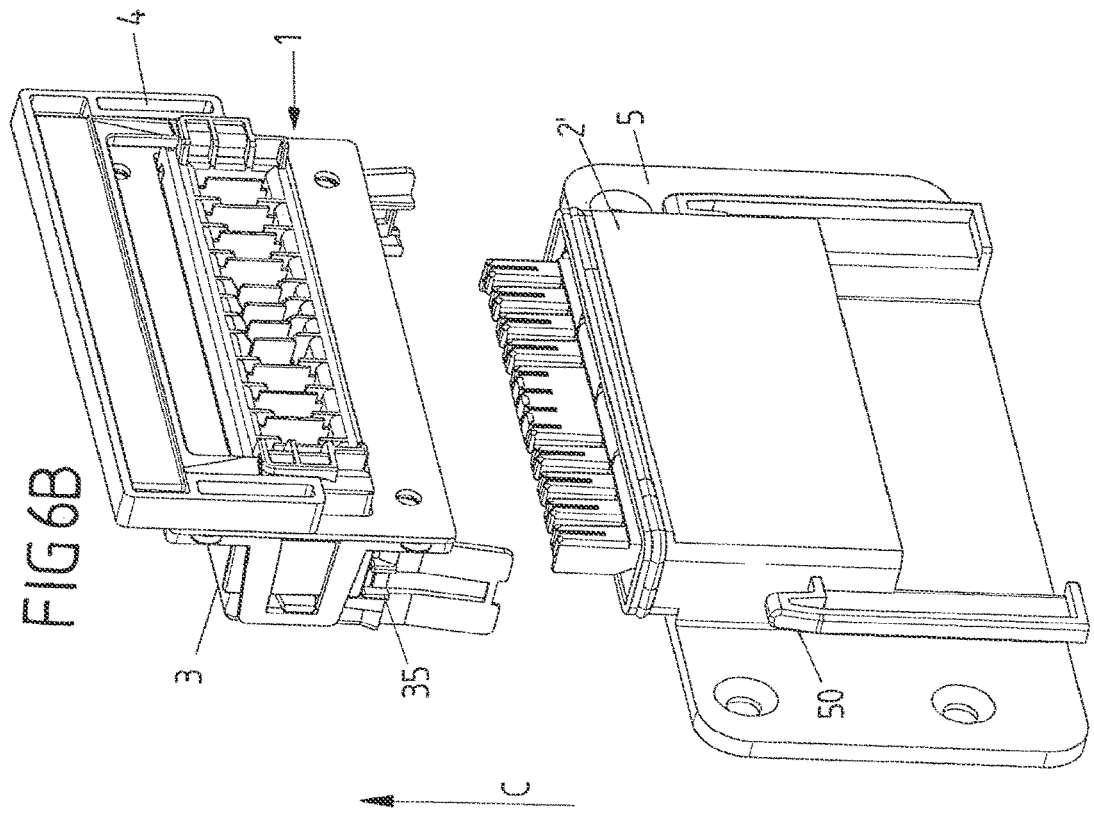
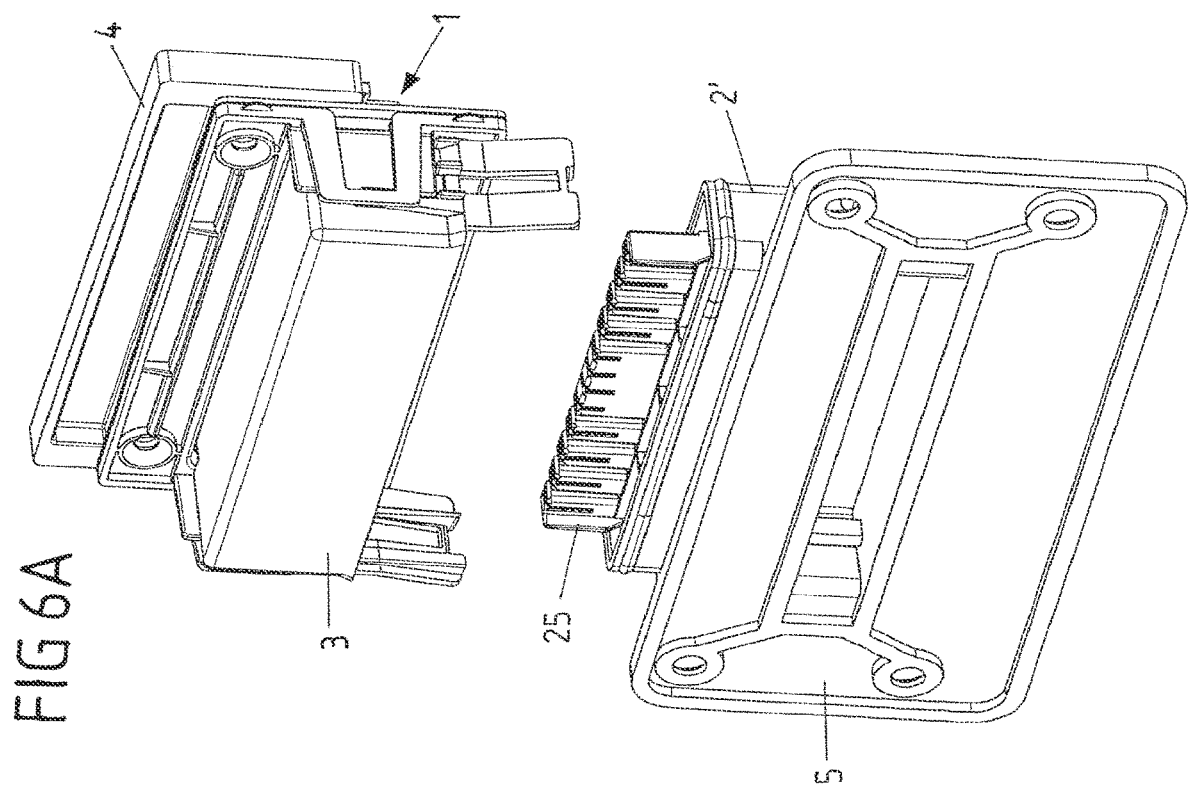

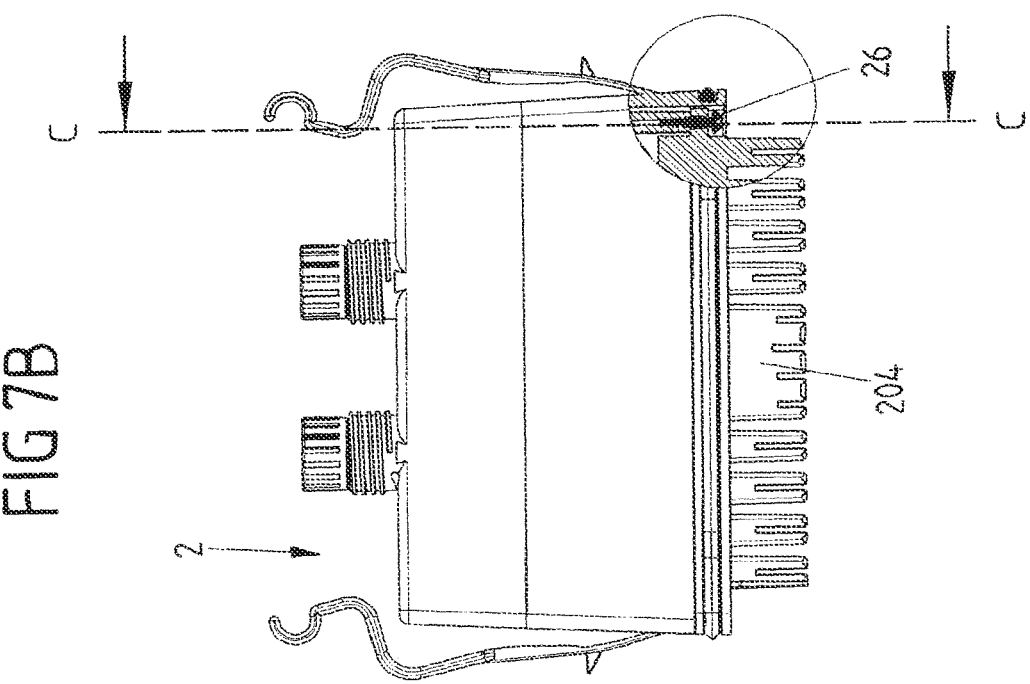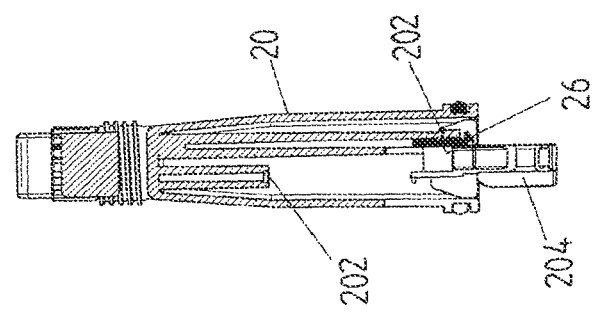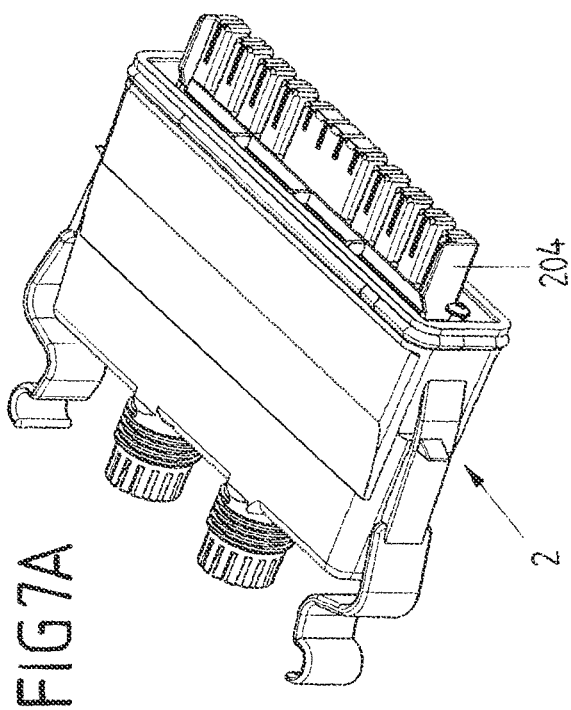

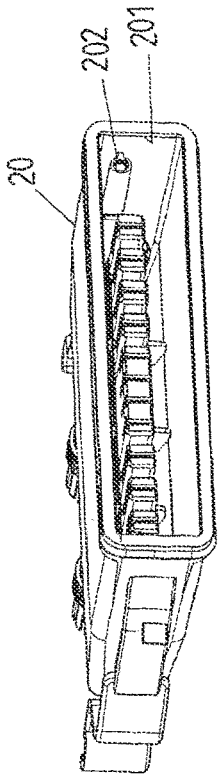
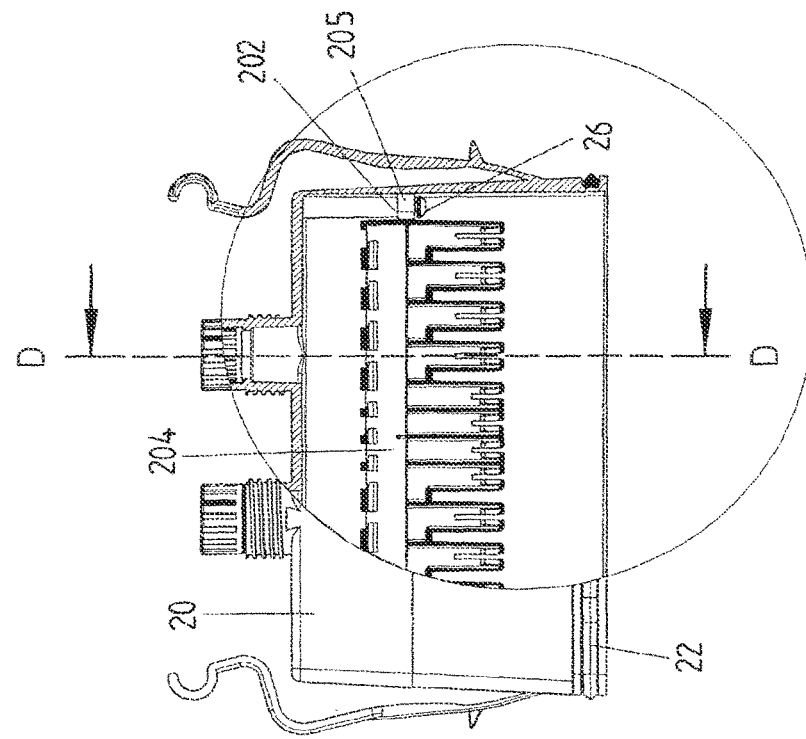
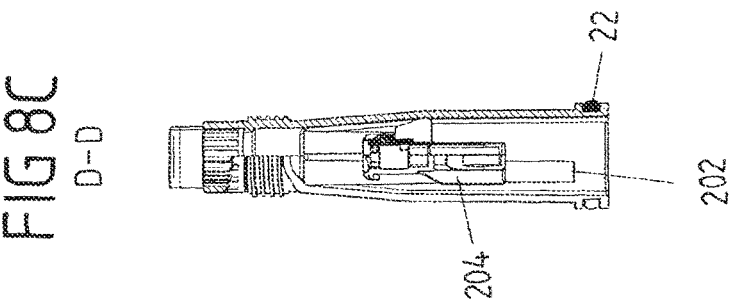

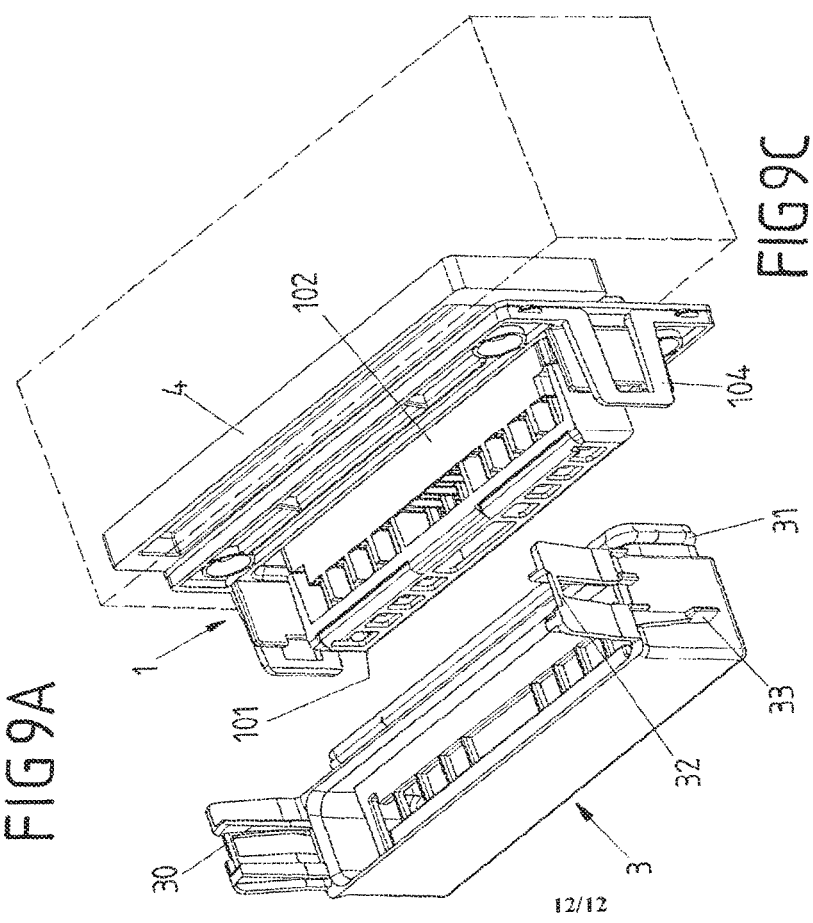
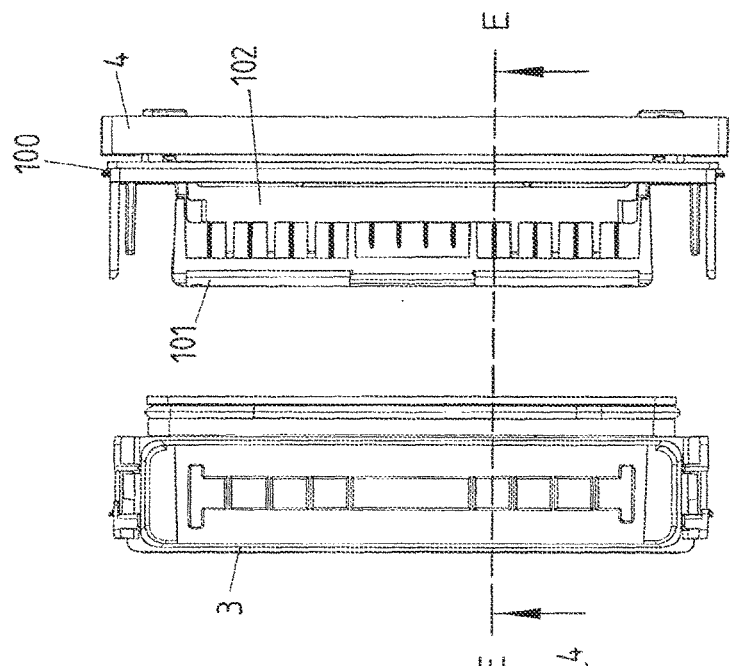
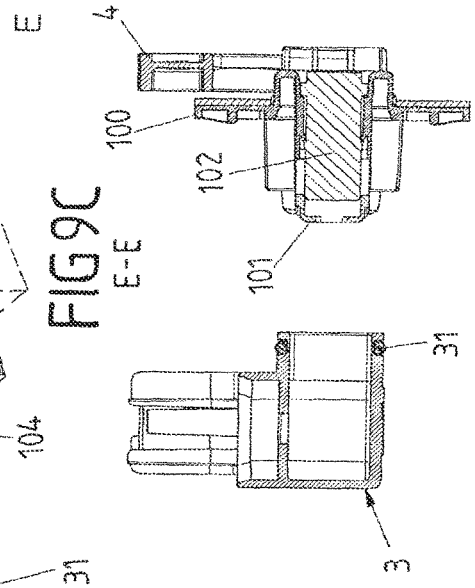

PLUG CONNECTOR PART FOR CONTACTING IN MULTIPLE SPATIAL DIRECTIONS

CROSS-REFERENCE TO PRIOR APPLICATIONS

This application is a U.S. National Phase application under 35 U.S.C. § 371 of International Application No. PCT/EP2019/083242, filed on Dec. 2, 2019, and claims benefit to German Patent Application No. DE 10 2018 132 142.2, filed on Dec. 13, 2018. The International Application was published in German on Jun. 18, 2020 as WO 2020/120186 under PCT Article 21(2).

FIELD

The invention relates to a plug connector part for electrical connection with a counter plug connector part, a plug connector arrangement and a plug connector having such a plug connector part, and a method of assembling a plug connector part.

BACKGROUND

Such a plug connector part for electrical connection to a counter plug connector part comprises a housing and a plurality of contacts arranged on the housing in such a manner that they can be electrically contacted from a plurality of different plugging directions by corresponding counter contacts of the counter plug connector part.

Plug connector parts are usually contacted axially, in particular when a fixed side (socket) and a movable side (plug) are used. For a contacting of two fixed sides, for example of battery modules among each other or in a rack, it is internally known to the applicant from practice to realize a contacting via a fixed assembly by means of current rails having screw terminals, to use connecting cables with plug and socket here as well, or to connect the modules electrically to one another frontally via two fixed plug connectors. In these cases, a major challenge is regularly the compensation of tolerances due to a possible skewed mating of the modules to one another in relation to the contact system, which should not be damaged.

In the use of battery modules, but also in a general context, it is desirable to enable plug connectors that can be used as flexibly as possible, so that the same plug connector part can be used in as many different applications as possible.

From DE 10 2014 102 555 B4, an electrical device is known that comprises a plug-in contact element with a plug-in contact portion, which is designed as a pendulum contact loosely mounted in an insulating material housing, wherein the plug-in contact portion has at least two different plug-in directions. By providing different insertion directions, increased flexibility is achieved in the use of the electrical device. However, the solution known from DE 10 2014 102 555 B4 is too fragile for some applications.

U.S. Pat. No. 8,246,357 B2 describes an electrical connector comprising a first main body and a second main body connectable to a counter plug connector part, wherein the second main body is pivotable relative to the first main body. In relation to the second main body, the plugging direction of a counter plug connector is therefore always the same. This solution is also too fragile for some applications due to the swing hinge.

SUMMARY

In an embodiment, the present invention provides a plug connector part for electrical connection to a counter plug connector part, comprising: a housing; and a plurality of contacts arranged on the housing such that the plurality of contacts are electrically contactable from different plugging directions by counter contacts of the counter plug connector part, wherein an angular location of the contacts relative to the housing is fixed.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1A to 1D are views of a plug connector part contactable from a plurality of plugging directions for electrical connection to a counter plug connector part;

FIG. 3A to 3C are views of the plug connector part in accordance with FIG. 1A to 1D and the counter plug connector part in accordance with FIG. 2A to 2D when inserted in a first plugging direction;

FIG. 4A to 4C are views of the plug connector part in accordance with FIG. 1A to 1D and the counter plug connector part in accordance with FIG. 2A to 2D when inserted in a second plugging direction;

FIGS. 5A and 5B are views of the plug connector part in accordance with FIG. 1A to 1D and the counter plug connector part in accordance with FIG. 2A to 2D when inserted in a third plugging direction;

FIGS. 6A and 6B are views of the plug connector part in accordance with FIG. 1A to 1D and a matching counter plug connector part when inserted in the third plugging direction;

FIG. 7A to 7C are views of the counter plug connector part in accordance with FIG. 2A to 2D having a housing and a counter contact holder mounted at a first position on the housing;

FIG. 8A to 8C are views of the counter plug connector part in accordance with FIG. 2A to 2D having the housing and the counter contact holder mounted at a second position on the housing; and FIG. 9A to 9C are views of the plug connector part in accordance with FIG. 1A to 1D and an angle adapter;

FIG. 1A to 1D show a plug connector part 1 for an electrical connection, in particular a releasable connection, with a counter plug connector part.

DETAILED DESCRIPTION

Figure 1D:
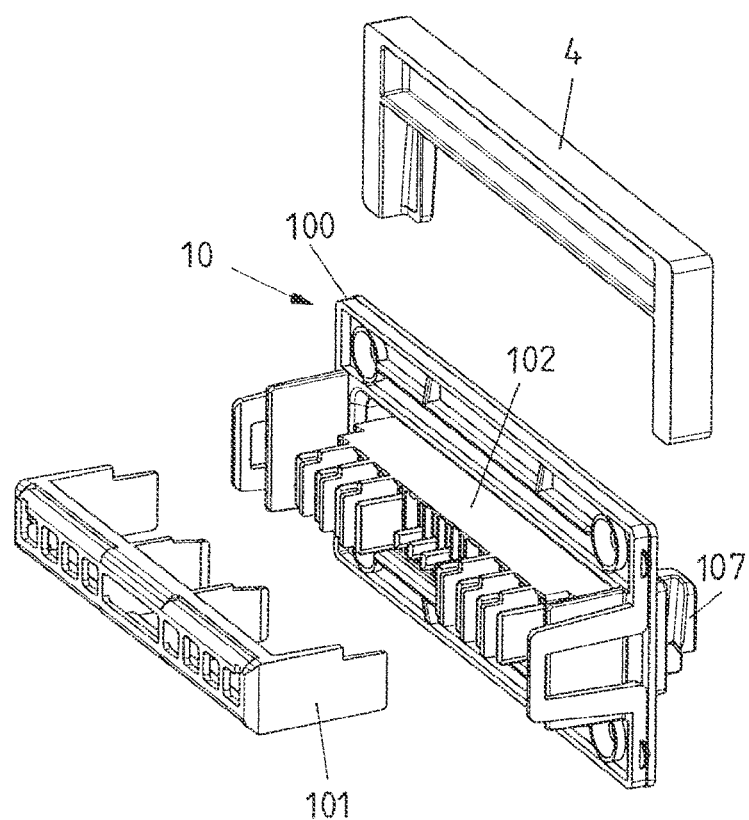

In an embodiment, the present invention provides an improved plug connector part.

Accordingly, it is provided that the angular location of the contacts relative to the housing is fixed.

In this manner, despite the provision of a plurality of different plugging directions, a particularly robust bearing of the contacts can be achieved, which enables an improvement of the plug connector part with regard to a flexible usage in a particularly large number of applications. In addition, the plug connector part is improved to enable a particularly simple structure.

A fixed angular location includes negligible movement of the contacts due to normal manufacturing tolerances. Alternatively, a completely immovable arrangement of the contacts on the housing is provided. In one embodiment, the contacts are permanently molded into the housing.

Optionally, the contacts are each in the form of a blade contact. Blade contacts can be formed to be very robust.

The housing can comprise a contact holder from which the contacts, in particular in the form of blade contacts, project in such a manner that they can be electrically contacted selectively from one of the plurality of different plugging directions by the counter contacts of the counter plug connector part. In this manner, a particularly flexible plug connector part is provided with a particularly simple structure.

In one embodiment, the contacts are arranged on the housing in such a manner that they can be electrically contacted from three or exactly three different plugging directions by the counter contacts of the counter plug connector part. This can further increase the flexibility of the applicability.

Optionally, two of the exactly three plugging directions provided are aligned antiparallel to one another. Alternatively or additionally, the third of the three plugging directions is oriented perpendicular to the remaining two. The three plugging directions correspond, for example, to "from below", "from the front" and "from above". This allows the plug connector part to be used in a particularly wide range of applications.

The plugging directions can be predetermined, in particular all of the possible plugging directions. This enables a particularly robust design for these plugging directions.

Optionally, the housing comprises a touch guard that partially covers the contacts to protect against contact. The touch guard can define openings through which the contacts from the different plugging directions can be electrically contacted by the counter contacts of the counter plug connector part. For example, the touch guard defines at least one opening for each plugging direction. This enables flexible usage with a high level of safety at the same time.

In one embodiment, the housing is configured to be mounted to a wall, such as a housing wall of an electrical apparatus.

In accordance with one aspect, a plug connector arrangement is provided comprising a plug connector part according to any embodiment described herein. The plug connector arrangement can further comprise an angle adapter which can be mounted or (in particular reversibly) mounted on the housing of the plug connector part in such a manner that the contacts of the plug connector part (which can be contacted per se from a plurality of, e.g. three, plugging directions) can be electrically contacted from exactly one plugging direction only by the counter contacts of the counter plug connector part. This allows additional functions, such as increased protection against moisture and dirt, while maintaining the flexibility of the applicability of the plug connector part. The angle adapter comprises, for example, two closed walls extending at an angle of, for example, 90° to one another.

In a further development, the angle adapter can optionally be mounted on the housing in one of several different alignments relative to the housing, wherein the alignment determines from which plugging direction the contacts of the plug connector part can be electrically contacted by the counter contacts of the counter plug connector part. Thus, only one angle adapter is needed for a plurality of different possible plugging directions, which keeps the number of parts low.

Optionally, the angle adapter comprises a seal. The seal can be arranged in such a manner that, in the mounted state (of the angle adapter on the housing of the plug connector part), it seals the angle adapter against the housing of the plug connector part, e.g. against liquids and/or dirt.

In one embodiment, the angle adapter comprises a guide for the counter plug connector. This enables particularly safe contacting. For example, the guide advances parallel to the corresponding plugging direction.

In accordance with an aspect, a plug connector is provided comprising a plug connector part and a counter plug connector part matching therewith, wherein it is provided that the plug connector part is formed according to any embodiment described herein. Optionally, the plug connector comprises the plug connector arrangement including the plug connector part and the angle adapter according to any embodiment described herein.

The counter plug connector part can have a housing that provides a plurality of alternative fastening locations for the counter contacts, in such a manner that the counter contacts can be selectively mounted thereon (in particular by means of a counter contact holder) at one of a plurality of positions relative to the housing of the counter plug connector. This can allow for further variability in application. In particular, a first position of the counter contacts on the housing of the counter plug connector part can enable contacting using the angle adapter and a second position can enable contacting without using the angle adapter.

The counter plug connector part may comprise a seal that, when the plug connector part is connected to the counter plug connector part, seals the housing of the counter plug connector part from the housing of the plug connector part or from the angle adapter optionally mounted to the housing of the plug connector part.

In an embodiment, the invention provides a method of assembling a plug connector part for electrical connection to a counter plug connector part, in particular the plug connector part according to any embodiment described herein, comprising the following steps: Providing a housing and a plurality of contacts arranged on the housing in such a manner as to be electrically contactable from different plugging directions by counter contacts of the counter plug connector part, wherein the angular location of the contacts relative to the housing is fixed; selecting one of the different plugging directions; and electrically contacting the contacts with the counter contacts by plugging the counter plug connector part to the plug connector part in the selected plugging direction.

The method may utilize the plug connector and/or plug connector arrangement according to any embodiment described herein.

The plug connector part 1 comprises a housing 10 and a plurality of contacts 11. The contacts are attached to a contact holder 102 of the housing 10. The angular location thereof relative to the housing 10 is fixed. In the present example, the contact holder 102 and the contacts form a contact strip having a plurality of contacts 11, some of which are formed differently in the example shown, and alternatively may be formed identically. The contacts 11 are in the form of blade contacts, see in particular FIG. 1B. The contacts 11 are each in the form of a flat plate.

The contacts 11 are arranged on the housing 10 in such a manner that they can be electrically contacted (from the point of view of the plug connector part 1) from a plurality of, specifically exactly three different plugging directions A, B, C by means of corresponding counter contacts of a suitable counter plug connector, see in particular FIG. 1A. For this purpose, the contacts 11 advance on the housing 10 (specifically on the contact holder 102) in such a manner that they can be touched by corresponding counter contacts approached from any of the three plugging directions A, B, C in order to establish a safe electrical contact.

In order to safely separate the individual contacts 11 from each other, a separating piece 106 is arranged between each two adjacent contacts 11. The separating pieces 106 may be integrally formed with the contact holder 102.

The housing 10 comprises a base body 100. The contact holder 102 is integrally formed with, or alternatively mounted to, the base body 100. The base body 100 comprises a plurality of fastening locations 103, in this case four, in the form of holes for screw or riveted connections in the example shown. By means of the fastening locations 103, the base plate 100 may be attached to a housing wall of an electrical or electronic apparatus. FIG. 1A to 1D further show an optional assembly adapter 4, which can be plugged onto the base plate 100 via guides 107, e.g. for pre-positioning or as an alternative fastening means for attachment, e.g. to a housing wall.

Of the three plugging directions A, B, C, two plugging directions A, C are antiparallel to one another, and the third plugging direction B is perpendicular to the other two plugging directions A, C. If the plug connector part 1 is mounted on a substantially vertical wall in such a manner that the contacts 11 are arranged side by side along the horizontal, then the plugging directions A, B, C correspond to a plugging "vertically downward" (plugging direction A), "horizontally" (plugging direction B) and "vertically upward" (plugging direction C). The plugging direction B extends parallel to a longitudinal axis of the contacts 11. The plugging directions A and C are perpendicular to one another and perpendicular to a straight line on which the individual contacts 11 are arranged next to one another.

The plug connector part 1 further comprises an (optional) touch guard 101, here in the form of a cage. The touch guard 101 defines openings for counter contacts from all three plugging directions A, B, C. For a counter plug connector plugged in plugging direction B, the touch guard 101 alone defines the openings. For plugging directions A and C, the touch guard 101 and the separating pieces 106 together define the openings. Optionally, some of the contacts are 11 load contacts. The touch guard 101 protects against contact with the contacts 11, in particular against contact with the load contacts.

In particular, due to the arrangement of these openings, the three plugging directions A, B, C are predetermined and arbitrary other plugging directions cannot be selected.

As can be seen in particular from FIG. 1A, the plug connector part 1 comprises means for specifying a particular orientation of the counter plug connector, in this case in the form of a plurality of clearances 105 at end portions of the contact holder 102 and the contact guard 101. These interact with projections on the counter plug connector part, described in more detail below, to prevent wrong plugging.

FIG. 1C further shows an optional angle adapter 3. The angle adapter 3 can be plugged onto the contact holder 102 with the contacts 11 (and optionally the contact guard 101), specifically in the plugging direction B. In the plugged-on position, the angle adapter 3 is latched by means of latching elements 104 projecting from the base body 100 of the housing 10 and thus fixed to the housing 10.

The angled connector 3 comprises a continuous, planar side wall and a continuous, planar bottom wall that are at right angles to one another. In a plane perpendicular to the side wall and parallel to the bottom wall, the angle adapter 3 defines a plug-in opening 34 through which the counter plug connector can be inserted in order to make electrical contact with the contacts 11. By plugging on the angled connector 3, the openings for the counter contacts for the two non-selected plugging directions are thus covered.

The angled connector 3 further comprises, here at opposite longitudinal ends, guides 30 for guiding the counter plug connector part into secure connection with the plug connector part 1. Latching elements 32 are also formed on the guides 30 for latching with the counter plug connector part in the plugged-in position.

Figure 2A:
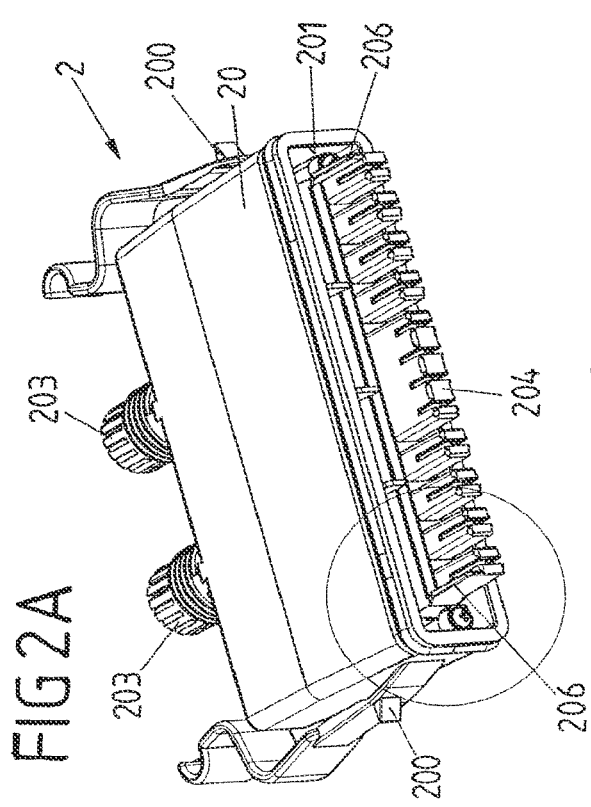
FIG. 2A to 2D are views of a counter plug connector part matching the plug connector part in accordance with FIG. 1A to 1D.
Figure 2B:
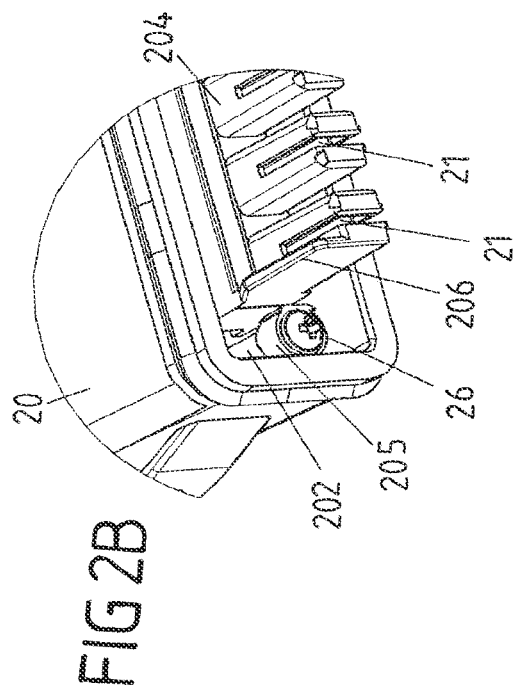
Figure 2C:
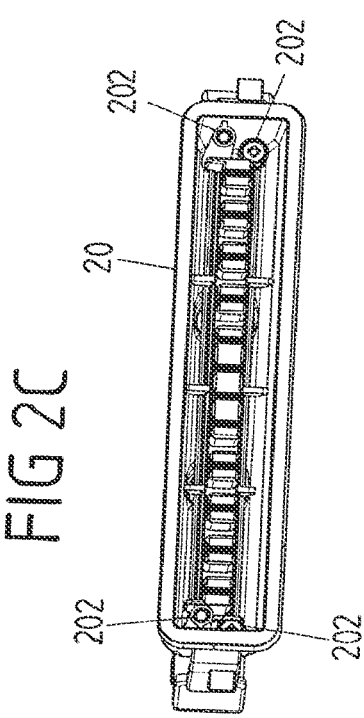
Figure 2D:
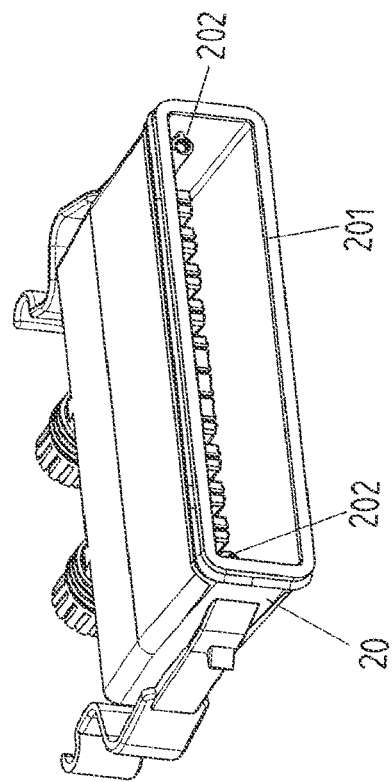

FIG. 2A to 2D show a counter plug connector part 2 designed to match the plug connector part 1 described above. Together, the plug connector part 1 and the counter plug connector part 2 form a plug connector. FIG. 2B shows an enlarged view of a section shown in FIG. 2A. FIGS. 2A and 2B, on the one hand, and FIGS. 2C and 2D, on the other hand, show two different configurations of the counter plug connector part 2, which will be explained in further detail below.

The counter plug connector part 2 comprises a housing 20 having a counter contact holder 204 on which a plurality of counter contacts 21 are mounted. The counter contacts 21 are each designed to make secure contact with a blade contact, e.g. to be force-fitted thereto. The counter contact holder 204 is attached to the rest of the housing 20, in this case by means of screws 26, wherein other fastening means are also conceivable. To this end, a plurality of sets of fastening locations 202 are formed on walls of the housing 20, wherein the opposing contact holder 204 may be selectively fastened to one or another of the sets of fastening locations 202. While in the configuration in accordance with FIGS. 1A and 1B the counter contact holder 204 is mounted at a position near an opening 201 defined by walls of the housing 20, in the configuration in accordance with FIGS. 2C and 2D it is mounted at a position recessed in an interior space spaced apart from the opening 201. Thus, the counter contact holder 204 is mountable to the remainder of the housing 20 in at least two different positions.

The housing 20 further comprises latching elements 200 in the form of hooks, which can be latched to the latching elements 104 of the housing 10 of the plug connector part 1 or to the latching elements 32 of the angle adapter 3. Here, the latching elements 200 are arranged on manually operable spring elements in such a manner that a latched connection can be released.

On the side facing away from the counter contacts 21, the counter plug connector 2 comprises one or a plurality of cable outlets 203, in this case two. The counter plug connector part 2 is a movable part and is not mounted on a housing wall or the similar.

In particular, it can be seen in FIGS. 2A and 2B that a respective projection 206 is formed adjacent to outer contacts 21 of the counter plug connector part 2, which projection 206 is formed asymmetrically in such a manner that the counter plug connector part 2 can be inserted (in each plugging direction A, B, C) in only one predetermined orientation in order to avoid false contacts. In the present case, the projections 206 each form a rib.

FIG. 3A to 3C show the insertion of the counter plug connector part 2 into the plug connector part 1 in the plugging direction A. For this purpose, the angle adapter 3 has been mounted on the housing 10 of the plug connector part 1 in such a manner that of the three predetermined plugging directions A, B, C only one, plugging direction A, is available.

In this plugging direction A, the counter contact holder 204 is mounted in such a manner that the counter contacts 21 protrude from the rest of the housing 20 (in this case a grommet of the counter plug connector part 2), in particular are not or not completely arranged in the interior space delimited by the opening 201 of the housing 20. When the counter plug connector part 2 is inserted, the counter plug connector part 2 is guided along the guides 30 of the angle adapter 3. The counter plug connector part 2 is inserted into a plug opening 34 defined by the angle adapter 3. In this case, the angle adapter 3 accommodates a part of the counter plug connector part 2.

In particular, it can be seen from FIG. 3C, which shows a cross-section through the plane A-A drawn in FIG. 3B, that the angle adapter 3 is plugged over the contact holder 102 having the contacts 11 and is sealed against the housing 10 in a liquid- and dust-tight manner by a seal 31, presently in the form of a circumferential seal.

The angle adapter 3 is not mandatory, but can improve guidance during insertion and provide sealing. Together with the plug connector part 1, the angle adapter 3 forms an arrangement or a set.

Figure 4A:
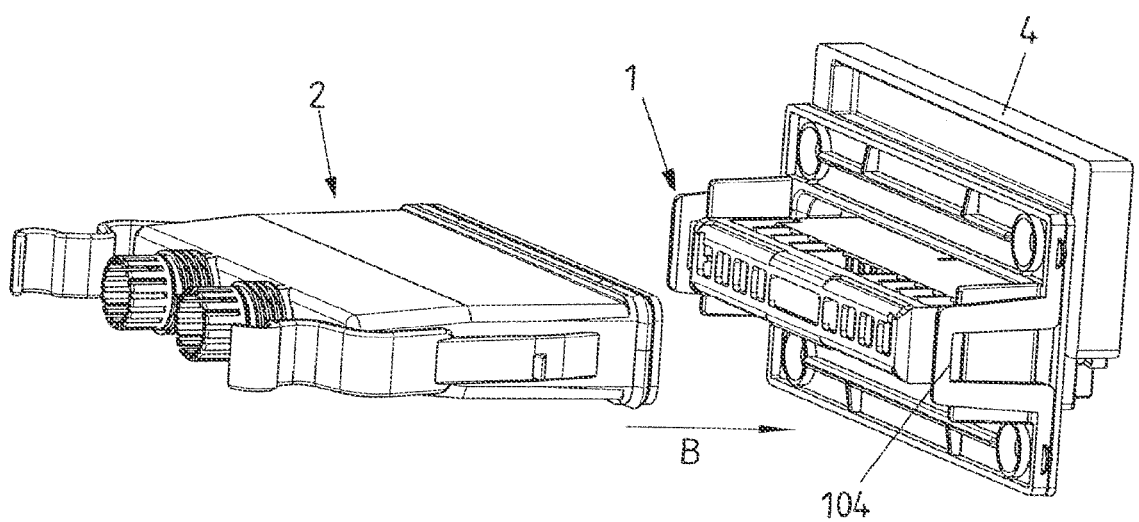

FIG. 4A to 4C show the insertion of the counter plug connector part 2 into the plug connector part 1 in plugging direction B. In this plugging direction B, the angle adapter 3 is not used, but the counter plug connector part 2 is plugged directly onto the contact holder 102 having the contacts 11 (and the touch guard 101 plugged over it) and latched with the latching elements 104 of the housing 10.

For this plugging direction B, the counter contact holder 204 is mounted in such a manner that the counter contacts 21 are completely arranged in the interior space delimited by the opening 201 of the housing 20, see in particular FIG. 4C. An outer circumferential seal 22 of the counter plug connector part 2 seals the housing 20 of the counter plug connector part 2 from the housing 10 of the plug connector part 1.

FIGS. 5A and 5B show the insertion of the counter plug connector part 2 into the plug connector part 1 in the plugging direction C. For this purpose, the angle adapter 3 has been mounted on the housing 10 of the plug connector part 1 in such a manner that of the three predetermined plugging directions A, B, C only one, plugging direction C, is available. Specifically, the angle adapter 3 is mounted on the housing 10 rotated 180° relative to the housing 10 compared to the plugging direction A arrangement. The remaining function is substantially the same as plugging in accordance with plugging direction A.

FIG. 5B further shows a back side, e.g., inner side, of the plug connector part 1 having a plurality of inner contacts 12.

By mounting the angle adapter 3 on the housing 10 of the plug connector part 1, one of the three possible plugging directions A, B, C can thus be predetermined. Further, the angle adapter 3 is designed to attach the counter plug connector part 2 to the plug connector part 1.

FIGS. 6A and 6B show the plug connector 1 having a mounted angle adapter 3 for plugging direction C when mated with an alternatively designed counter plug connector part 2'. The counter plug connector part 2' in accordance with FIGS. 6A and 6B comprises a wall plate 5 intended for mounting on a housing wall of an electrical or electronic apparatus. The electrical or electronic housings having the plug connector part 1 and the counter plug connector part 2' are moved relative to one another in such a manner that, from the point of view of the plug connector part 1, the counter plug connector part 2' is inserted in the plugging direction C.

The angle adapter 3 comprises guides 35 on the outer sides, which are engageable with matching rails 50 of the wall plate 5. The guides 35 are designed, for example, to form a tongue-and-groove guide. Alternatively, the guides 35 are inclined to form a dovetail guide. This allows a particularly large amount of weight to be absorbed in the guide.

FIGS. 7A to 7C and 8A to 8C show the two configurations of the counter plug connector part 2 in accordance with FIG. 2A to 2D with the protruding arrangement of the counter contacts 21 (for the vertical plugging directions A, C, FIG. 7A to 7C) and with the retracted arrangement of the counter contacts 21 (for the horizontal plugging direction B, see FIG. 8A to 8C).

In particular, it can be seen that the housing 20 of the counter plug connector part 2 has screw domes of different lengths, each of which provides the selectable fastening locations 202 at its open ends. For example, FIG. 8A shows that in the retracted configuration, the longer shear domes remain unused.

FIG. 9A to 9C show in particular the angle adapter 3 and the circumferential seal 31 thereof. FIG. 9C shows in cross-section that the angle adapter 3 can be inserted into a circumferential groove on the base body of the housing 10, against which the seal 31 can also be brought into sealing contact.

Particularly in FIGS. 9A and 9B, it can also be seen that latching elements 33 in the form of latching lugs are provided at the longitudinal ends of the angle adapter 3, which can be brought into latching engagement with the latching elements 204 of the housing 10.

Further, it can be seen that the guides 30 of the angle adapter 3 protrude against the respective plugging direction A, C, so that the counter plug connector part 2, 2' is guided into a secure, electrical contacting engagement. The guides 30 each comprise guide walls that are parallel to one another.

When assembling the plug connector part 1 for electrical connection with the counter plug connector part 2; 2', the procedure is thus as follows:

First, the plug connector part 1 is provided (see in particular FIG. 1A).

Then one of the different plugging directions A, B, C is selected (see in particular FIG. 1A).

Optionally, the angle adapter 3 is then mounted (see in particular FIGS. 9C and 1C).

Then the contacts 11 are electrically contacted with the counter contacts 21 by plugging the counter plug connector part 2; 2' to the plug connector part 1 in the selected plugging direction A, B, C (see in particular FIG. 3A to 5B).

The plug connector part 1 can thus be electrically contacted in three degrees of freedom, thus enabling particularly flexible usage. The plug connector part 1 and the counter plug connector part 2, 2' are particularly suitable for usage with battery modules. FIG. 9A schematically shows a battery module in dashed lines. In accordance with an aspect, a battery module having a plug connector part 1 is provided. The plug connector part 1 is arranged on one side of the battery module, for example. The battery module can thus be contacted from above, below and the (front) side and can thus be electrically connected to other battery modules in a particularly flexible manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE LIST

1 Plug connector part
10 Housing
100 Base body
101 Touch guard
102 Contact holder
103 Fastening location
104 Latching element
105 Clearance
106 Separating piece
107 Guide
11 Contact
12 Inner contact
2, 2' Counter plug connector part
20 Housing
200 Latching element
201 Opening
202 Fastening location
203 Cable outlet
204 Counter contact holder
205 Fastening location
206 Projection
21 Counter contact
22 Seal
26 Screw
3 Angle adapter
30 Guide
31 Seal
32 Latching element
33 Latching element
34 Plug opening
35 Guide
4 Assembly adapter
5 Wall plate
50 Rail
A, B, C Plugging direction

The invention claimed is:

1. A plug connector arrangement, comprising:
a plug connector part for electrical connection to a counter plug connector part, comprising:
a housing; and
a plurality of contacts arranged on the housing such that the plurality of contacts are electrically contactable from different plugging directions by counter contacts of the counter plug connector part; and
an angle adapter which is mountable on the housing of the plug connector part such that the plurality of contacts of the plug connector part are electrically contactable from only exactly one plugging direction by the counter contacts of the counter plug connector part,
wherein an angular location of the contacts relative to the housing is fixed,
wherein the angle adapter is mountable on the housing in one alignment of a plurality of different alignments relative to the housing, and
wherein the one alignment determines from which plugging direction the plurality contacts are electrically contactable by the counter contacts of the counter plug connector part.

2. The plug connector arrangement of claim 1, wherein the each contact of the plurality of contacts comprises a blade contact.

3. The plug connector arrangement of claim 1, wherein the housing comprises a contact holder from which the plurality of contacts project such that the plurality of contacts are electrically contactable from the various plugging directions by the counter contacts of the counter plug connector part.

4. The plug connector arrangement of claim 1, wherein the plurality of contacts are arranged on the housing such manner that the plurality of contacts are electrically contactable from exactly three different plugging directions by counter contacts of the counter plug connector part.

5. The plug connector arrangement of claim 4, wherein a first and a second of the three plugging directions are aligned antiparallel to one another and a third of the three plugging directions is aligned perpendicular to the first and second plugging directions.

6. The plug connector arrangement of claim 1, wherein the plugging directions are predetermined.

7. The plug connector arrangement of claim 1, wherein the housing comprises a touch guard which partially covers the plurality of contacts for protection against contact and at least partially defines openings through which the plurality of contacts are electrically contactable from the plugging directions by the counter contacts of the counter plug connector part.

8. The plug connector arrangement of claim 1, wherein the housing is configured to mount on a wall.

9. The plug connector arrangement of claim 1, wherein the angle adapter comprises a seal which, in an assembled state, is configured to seal the angle adapter with respect to the housing of the plug connector part.

10. The plug connector arrangement of claim 1, wherein the angle adapter comprises a guide for the counter plug connector part.

11. A plug connector, comprising:
the plug connector arrangement of claim 1; and
the counter plug connector part.

12. The plug connector of claim 11, wherein the counter plug connector part comprises a housing providing a plurality of alternative fastening locations for the counter contacts, such that the counter contacts are selectively mountable or mounted thereon at one of a plurality of positions relative to the housing of the counter plug connector.

13. The plug connector of claim 12, wherein the counter plug connector part comprises a seal which, in a connected state of the plug connector part with the counter plug connector part, is configured to seal the housing of the counter plug connector part with respect to the housing of the plug connector part or with respect to an angle adapter mounted on the housing of the plug connector part.

14. A method for assembling the plug connector arrangement of claim 1, the method comprising:
providing the housing and the plurality of contacts which are arranged on the housing such that the plurality of contacts are electrically contactable from different plugging directions by counter contacts of the counter plug connector part, an angular location of the plurality of contacts relative to the housing being fixed;
selecting one of the different plugging directions as a selected plugging direction; and
electrically contacting the plurality of contacts with the counter contacts by plugging the counter plug connector part to the plug connector part in the selected plugging direction.

15. A plug connector, comprising:
a plug connector part for electrical connection to a counter plug connector part, comprising:
a housing; and
a plurality of contacts arranged on the housing such that the plurality of contacts are electrically contactable from different plugging directions by counter contacts of the counter plug connector part; and
a matching counter plug connector part,
wherein an angular location of the contacts relative to the housing is fixed, and
wherein the counter plug connector part comprises a housing providing a plurality of alternative fastening locations for the counter contacts, such that the counter contacts are selectively mountable or mounted thereon at one of a plurality of positions relative to the housing of the counter plug connector.

16. The plug connector of claim 15, wherein the counter plug connector part comprises a seal which, in a connected state of the plug connector part with the counter plug connector part, is configured to seal the housing of the counter plug connector part with respect to the housing of the plug connector part or with respect to an angle adapter mounted on the housing of the plug connector part.

* * * * *